United States Patent [19]

Jüng

[11] Patent Number: 4,668,979
[45] Date of Patent: May 26, 1987

[54] PRODUCTION OF COLOR SEPARATIONS FOR SINGLE COLOR PRINTING IN WHICH SEPARATION HUES AND COLORS ARE OPTIMALLY DEFINED WITH RESPECT TO HUE, COLOR SEPARATION, AND LUMINANCE

[75] Inventor: Eggert Jüng, Schoenberg, Fed. Rep. of Germany

[73] Assignee: Dr. Ing. Rudolf Hell GmbH, Fed. Rep. of Germany

[21] Appl. No.: 680,773

[22] Filed: Dec. 12, 1984

[30] Foreign Application Priority Data

Dec. 14, 1983 [EP] European Pat. Off. ....... 83 112580.2

[51] Int. Cl.$^4$ .......................... G03F 3/08; H04N 1/46
[52] U.S. Cl. ........................................ 358/75; 358/80
[58] Field of Search .............................. 358/75, 78, 80

[56] References Cited

U.S. PATENT DOCUMENTS

4,194,839  3/1980  Knop ................................... 356/407
4,261,011  4/1981  Knop ..................................... 358/75
4,564,859  1/1986  Knop et al. ............................ 358/75

Primary Examiner—James J. Groody
Assistant Examiner—Randall S. Svihla
Attorney, Agent, or Firm—Hill, Van Santen, Steadman & Simpson

[57] ABSTRACT

In electronic reproduction technology, a method and apparatus for production of color separations from color originals for single color printing. The color original is opto-electronically scanned point-by-point and line-by-line for generating measured color values. Chrominance values are obtained from the measured color values by an adjustable coordinate transformation, and a hue signal is acquired from the chrominance values by quotient formation. A hue control signal is derived from the hue signal, said hue control signal having a maximum value for a selectable separation hue of a color of the scanned original and becoming zero for an adjustable, maximum deviation from the separation hue. During recording of the color separation of a separation hue, the hue control signal is directly employed for controlling the recording element which records the color separation point-by-point and line-by-line. For recording a color separation of a separation color, a color saturation signal and a luminance signal are additionally derived from the measured color value signals, and transformed into a color saturation control signal and a luminance control signal by amplitude and/or non-linear modification. The hue control signal, color saturation control signal, and luminance control signal are combined into the separation signal. The production of color separations for single color printing is significantly improved by the individual setting of the curves of the control signals dependent on hue, color saturation, and luminance on the one hand, and, on the other hand, by a controlled color desaturation.

19 Claims, 9 Drawing Figures

PRODUCTION OF COLOR SEPARATIONS FOR SINGLE COLOR PRINTING IN WHICH SEPARATION HUES AND COLORS ARE OPTIMALLY DEFINED WITH RESPECT TO HUE, COLOR SEPARATION, AND LUMINANCE

BACKGROUND OF THE INVENTION

In electronic reproduction technology for single color printing, a method and an apparatus for production of color separations for single color printing is provided. What is meant by single color printing is, for example, textile, decorative, or packaging printing.

Whereas the inking of the print medium in polychromatic mixed printing occurs by superimposed printing of different proportions of the inks "yellow", "magenta", "cyan", and "black", each color to be printed in single color printing is blended before the printing process and is then separately applied to the print medium, so that a corresponding color separation must be produced for every color of a color original.

Such a color original comprises, for example, hues having a progressive color distribution, i.e. having different color saturation and/or luminance within the individual hues. In this case, the color separations must supply information with respect to a topical distribution of the individual colors as well as information with respect to the color progression, i.e. with respect to the topically different intensities of the ink application.

An apparatus for the production of color separations for single color printing is already known from German Letters Patent No. 26 28 053, corresponding to U.S. Pat. No. 4,194,839, incorporated herein by reference. Three primary measured color value signals are acquired by opto-electronically scanning a color original point-by-point and line-by-line, said measured color value signals representing the color components red, green, and blue of the scanned image points. A color recognition circuit which receives the measured color value signals and in which a color recognition region for a color to be separated (separation color) in the color original is defined with a color space, selects the selected separation color from the other colors of the color originals during the scanning of the original and always generates a color recognition signal when the selected separation color is recognized in the color original. The color recognition signal is forwarded as a color separation signal to a recording element, for example a write lamp, whose brightness is modulated as a function of the color separation signal. The write lamp exposes a film as a recording medium point-by-point and line-by-line, said film representing the color separation for the selected separation color after it has been developed.

The known apparatus has the disadvantage that essentially only prismatic color recognition spaces can be defined. The color recognition spaces can therefore not be optimally matched in terms of size and shape to the color regions prescribed by the color progressions of the separation colors, the color separation signal thus not supplying an unequivocal statement with respect to the color saturation and/or luminance of the separation colors.

Another apparatus for the production of color separations for single color printing is disclosed in German Letters Patent No. 28 53 511, corresponding to U.S. Pat. No. 4,261,011, incorporated herein by reference. Given this apparatus, corrected color separation signals are derived from the measured color value signals and one of the corrected color separation signals is selected for recording a color separation for the single color printing. A color recognition signal which supplies a yes/no statement with respect to the presence of the selection separation color in the color original is generated with the assistance of a color recognition circuit in which a color recognition space for the separation color is again defined. During recording of the color separation, the color recognition signal always connects through the selected, corrected color separation signal to the write lamp when the pre-set separation color is recognized in the color original. As a consequence of the switching, the color distributions in the color separations always appear sharply delineated, so that the individual separation colors are printed exactly side-by-side in the printing occurring later. This can occasionally lead to disturbing contours of color progressions in the print.

A modification of the above-described apparatus is known from the European Patent Application No. 82112002.9, incorporated herein by reference, wherein the formation of such contours is in fact reduced, but a progressive color separation signal which exactly reproduces a color progression is nonetheless not generated therein.

All known apparatus also have the disadvantage that they are not specifically designed for the extraction of hues.

SUMMARY OF THE INVENTION

It is an object of the invention to specify a method and an apparatus for the production of color separations for single color printing by which separation hues and separation colors can be optimally defined with respect to hue, color saturation, and luminance, and with which color separation signals which exactly reproduce the color progressions in separation hues and separation colors can be generated.

When recording color separations, the specified invention also enables an exact separation of the separation hues from their complementary hues and from hues in the gray region.

According to the invention, the color original is trichromatically scanned point-by-point and line-by-line by an opto-electronic scanning element for acquisition of measured color value signals. A recognition region is defined and a separation signal A is generated when the measured color value signals R, G, B fall into the defined region. A color locus $F_0$ of a selected separation hue $T_0$ of a color of the original is determined by color values $R_0$, $G_0$, $B_0$. The color locus $F_0$ of the separation hue is transformed into the chrominance plane of the chrominance/luminance color space by a first transformation of its color values $R_0$, $G_0$, $B_0$ into chrominance values $x'_0$, $y'_0$ such that a transformed color locus $F'_0$ lies on one of the axes of an $X'Y'$ color coordinate system in the chrominance plane, and the transformation coefficients required therefor are retained. The color separation is recorded point-by-point and line-by-line by a recording element controlled by the separation signal A. During the recording of the color separation the following occurs. Color loci of the hues of the scanned colors of the original are continuously transformed into the chrominance plane by a second transformation of the measured color value signals R, G, B into chrominance values $x'$, $y'$ with the previously determined transformation coefficients. Those chrominance values x', y' are selected whose corresponding transformed color loci F' lie in a same half of the X'Y' color coordinate system as the transformed color locus F'$_0$ of the separation hue T$_0$. A hue signal T' is derived from at least those chrominance values y' which correspond to the value distances of the transformed color loci F' from the corresponding axis, said hue signal T' being an approximate measure for an amount of hue deviation of the hues of the scanned colors of the original from the separation hue T$_0$. A hue control signal T* is acquired from a substantially constant auxiliary control signal H$_0$ and the hue signal T', said hue control signal having its highest value when scanning the separation hue T$_0$ and having the value zero when scanning a hue having a prescribed maximum hue deviation from the separation hue T$_0$, whereby a sector-shaped hue recognition region is defined around the separation hue T$_0$. The hue control signal T* is employed for the formation of the separation signal A for the color separation of the selected separation hue T$_0$.

DESCRIPTION OF THE PREFERRED EMBODIMENTS

Figure 1:
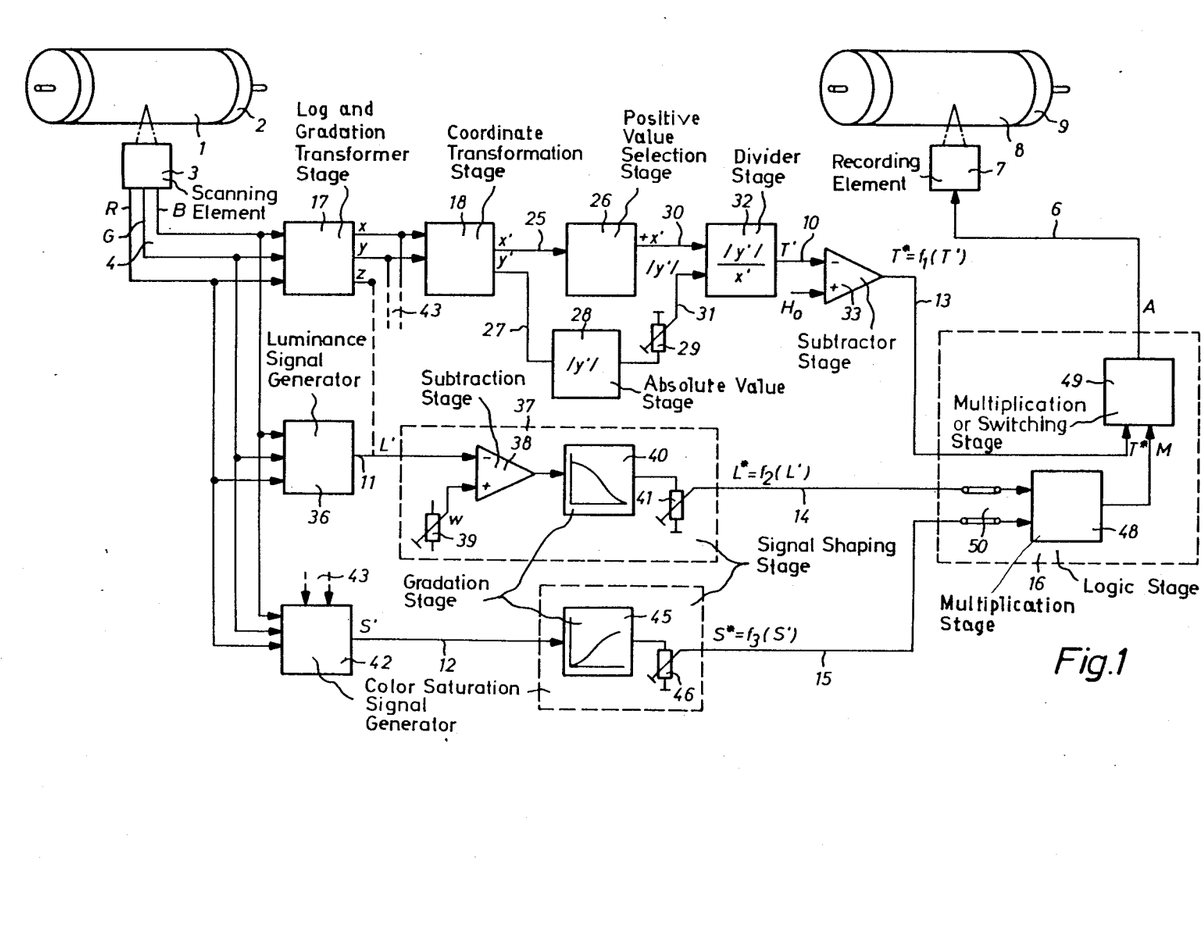
FIG. 1 is an illustrative embodiment of an apparatus for the production of color separations for single color printing.

FIG. 1 shows an illustrative embodiment of an apparatus for the production of color separations for a single color printing which is referred to below as a color scanner for single color printing.

As already presented in the introduction to the specification, every individual color to be printed is blended before the printing process given single color printing, as opposed to polychromatic mixed printing, and the various individual colors are applied to the print medium in separate operations. Given single color printing, therefore, a corresponding color separation must be produced for every individual hue to be separated or for every individual color to be separated in the color original to be reproduced, whereby the concern is that the color progressions of the color original are reproduced as well as possible in the color separations.

Figure 7:
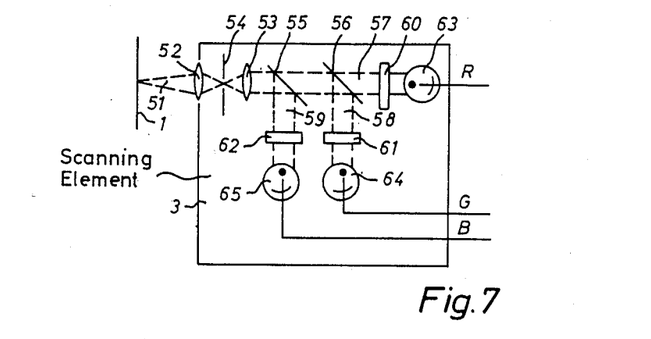
FIG. 7 is an illustrative embodiment of a scanning element.

The color original 1 from which the corresponding color separations are to be produced for single color printing is situated on a rotating scanner drum 2 of a color scanner (not shown in greater detail) and is trichromatically scanned point-by-point and line-by-line by an opto-electronic scanning element 3. The scan light reflected or transmitted by the scanned color original 1 is converted into the measured color value signals R, G, and B in the opto-electronic scanning element 3 with the assistance of color splitters, corrective filters, and opto-electronic transducers. The measured color value signals R, G and B are a measure for the intensities of the primary color components "red", "green", and "blue" of the scanned colors. The measured color value signals R, G, and B represent the spatial or color coordinates of the color loci of the scanned colors in the cartesian RGB color space. The opto-electronic scanning element 3, which is axially displaceable relative to the scanner drum 2, is employed both for measuring individual color points in the color original 1 as well as for the area-wise point-by-point and line-by-line scanning of the color original 1 during the actual recording of the color separations. FIG. 7 shows an illustrative embodiment of an opto-electronic scanning element.

The measured color value signals R, G, and B proceed via lines 4 to a circuit arrangement for generating a single color separation signal A on a line 6. The single color separation signal A is forwarded via the line 6 to a recording element 7 in the form of a write lamp. The recording element 7, whose brightness is modulated by the single color separation signal A, exposes a recording medium 8, for example a film, which is disposed on a rotating recording drum 9, and exposes the medium point-by-point and line-by-line. The exposed and developed film is the desired color separation.

A hue signal T' on a line 10, a luminance signal L' on a line 11, as well as a color saturation signal S' on a line 12, are generated in the circuit arrangement from the supplied measured color value signals R, G, and B, the signals T', L', and S' being converted by signal limitation and, under given conditions, by additional shaping into a hue control signal T* = f$_1$ (T') on a line 13, into a luminance control signal L* = f$_2$ (L') on a line 14, and into a color saturation control signal S* = f$_3$ (S') on a line 15, respectively.

Hue (T), color saturation (S), and luminance (L) are the cylindrical color coordinates of the hue/saturation/luminance color space, whereby the position of the color loci in the chrominance plane are defined by the hue values T as angles and by the color saturation values S as radii, whereas the luminance values of the colors are defined by the luminance L.

When the color separation of a selected hue of the color original 1 is to be recorded, the hue signal T' is limited such that it differs from zero only for those hues which lie within a sector-shaped hue region in the chrominance plane around a hue that is freely selectable in all four quadrants, referred to below as the separation hue T$_0$. In this case, the limited hue control signal T* is employed as the single color separation signal A which supplies information regarding the distance of the hues of the scanned colors from the established separation hue T$_0$ when the hues of the scanned colors lie within the defined region, and which is equal to zero when the hues of the scanned colors do not fall within the defined hue region.

When the color separation of a specific separation color of the color original 1 is to be recorded, the sector-shaped hue region is also additionally defined with respect to the luminance and the color saturation by means of corresponding limitation of the luminance signal L' and/or of the color saturation signal S'. In this case, the single color separation signal A is derived by means of combination of the hue control signal T*, the luminance control signal L*, and the color saturation control signal S* in a logic stage 16. The structure and function of the circuit arrangement shall be explained in greater detail below, first for that case in which hues are to be separated.

The measured color value signals R, G, and B supplied from the opto-electronic scanning element 3 via the lines 4 are first logarithmized or partially logarithmized in a transformer stage 17 and, under given conditions, are corrected according to a gradation curve. The transformed color value signals R', G', and B' thus acquired are transformed into chrominance signals x and y and into a luminance signal z by a matrixing according to equations (1).

$$x = a_{11}R' + a_{12}G' + a_{13}B'$$
$$y = a_{21}R' + a_{22}G' + a_{23}B'$$
$$z = a_{31}R' + a_{32}G' + a_{33}B' \quad (1)$$

The matrixing corresponds to a transformation of the color coordinates of the cartesian RGB color space into the color coordinates x, y, and z of the cartesian chrominance/luminance color space, whereby the color coordinates x and y identify the position of the color loci of the colors in the chrominance plane and the color coordinates z identify the luminance values of the colors.

First, the desired separation hue $T_0$ around which a hue region is to be limited is defined by prescribing a measured color value triad $R_0$, $G_0$ and $B_0$ or by prescribing its chrominance values $x_0$ and $y_0$ formed by matrixing or by measuring a sample point in the color original 1 with the assistance of the opto-electronic scanning element 3.

The chrominance values $x_0$ and $y_0$ are transformed according to the invention into corresponding chrominance values $x'_0$ and $y'_0$ by a matrixing according to equations (2) which can be set to the selected separation hue $T_0$, whereby the transformation coefficients b, c, d, and e are defined such that the conditions $x'_0 > 0$ and $y'_0 = 0$ are met.

$$x'_0 = bx_0 + cy_0$$
$$y'_0 = -dx_0 + ey_0 \quad (2)$$

Transformation coefficients having the form $b = e = \cos\alpha$ and $c = -d = \sin\alpha$ are preferably employed in the selected illustrative embodiment, so that the matrixing corresponds to the rotation of an X'Y' color coordinate system by an angle $\alpha$ relative to the original XY color coordinate system according to equation (3).

$$x'_0 = x_0 \cos\alpha + y_0 \sin\alpha$$
$$y'_0 = -x_0 \sin\alpha + y_0 \cos\alpha \quad (3)$$

The angle $\alpha$ required for meeting the conditions $x'_0 > 0$ and $y'_0 = 0$ is defined in a transformation stage 18 by an automatic balancing operation given continuous monitoring of the conditions $x'_0 > 0$ and $y'_0 = 0$ in a monitoring stage within the transformation stage 18, since the angle $\alpha$ is modified such that the conditions are met. The determined angle $\alpha_0 = \arctan y_0/x_0$ corresponds to the separation hue $T_0$ and the X' axis of the X'Y' color coordinate system rotated by the angle $\alpha_0$ proceeds through the color locus F'$_0$ of the separation hue $T_0$ transformed into the chrominance plane. The described coordinate rotation corresponds to a rotation of the chrominance/luminance color space around the luminance axis.

The determined angle $\alpha_0$ is stored in the transformation stage 18 and is employed during the recording of the color separation for the continuous transformation of the chrominance signals x and y into the rotated chrominance signals x' and y' according to equations (4), whereby the rotated chrominance signal y' differs from zero for all hues of the scanned colors which deviate from the selected separation hue $T_0$ and is equal to zero for all hues that coincide with the selected separation hue $T_0$:

$$x' = x \cos\alpha_0 + y \sin\alpha_0$$
$$y' = -x \sin\alpha_0 + y \cos\alpha_0 \quad (4)$$

It is within the framework of the invention to execute the matrixings in a single step.

Figure 8:
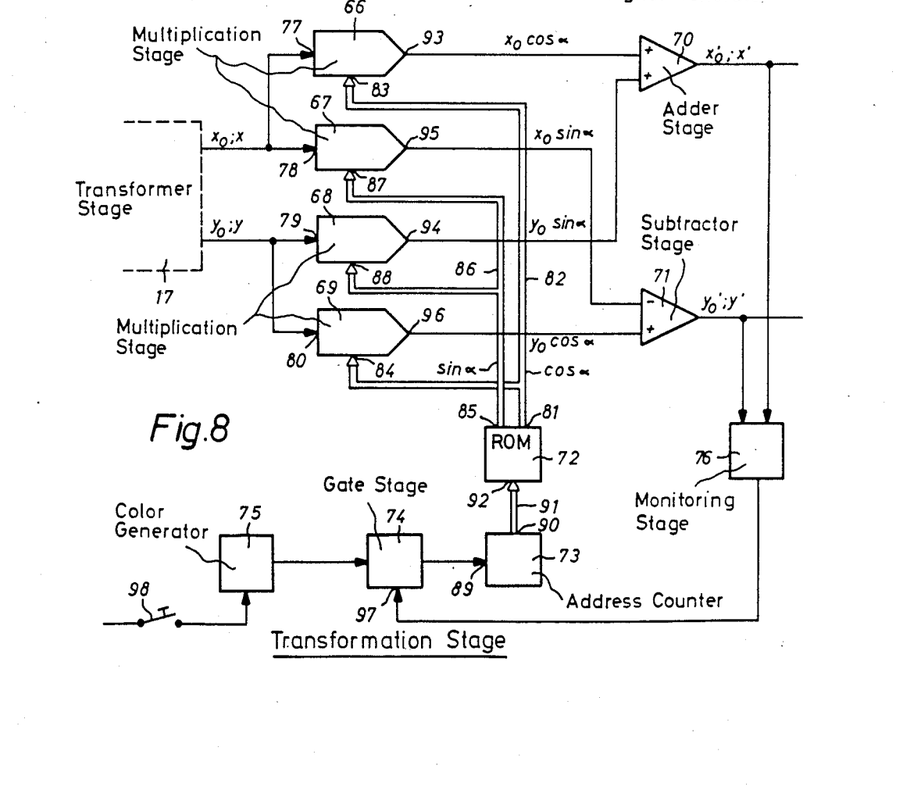
FIG. 8 is an illustrative embodiment of a transformation stage.

A more detailed illustrative embodiment of the transformation stage 18 is specified in FIG. 8.

Figure 2:
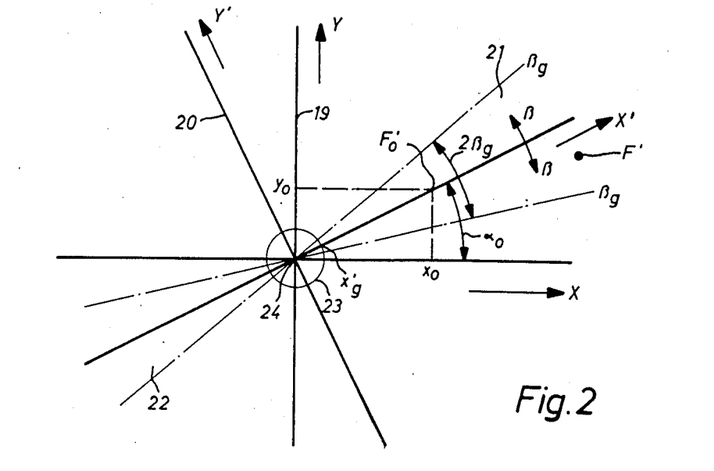
FIG. 2 is a graphic presentation related to coordinate rotation.

The above-described coordinate rotation shall be illustrated again with reference to a graphic presentation in FIG. 2.

FIG. 2 shows the chrominance plane of the chrominance/luminance color space having the XY color coordinate system 19, whereby the Z axis (gray axis) of the chrominance/luminance color space proceeds perpendicular to the chrominance plane. A transformed color locus F'$_0$ of a selected separation hue $T_0$ is defined in the XY color coordinate system 19 by the color coordinates $x_0$ and $y_0$. The X'Y' color coordinate system 20 rotated by the angle $\alpha_0$ whose X' axis proceeds through the transformed color locus F'$_0$, is shown at the same time, so that the transformed color locus F'$_0$ in the rotated X'Y' color coordinate system 20 has the color coordinates $x'_0 > 0$ and $y'_0 = 0$. The angle $\alpha_0 = \arctan y_0/x_0$ corresponds to the separation hue $T_0$ in the XY color coordinate system 19.

A sector-shaped hue region 21 symmetrical to the X' axis of the rotated X'Y' color coordinate system 20 is shown at the same time, the critical angle $\beta_g$ (aperture angle $2\beta_g$) of region 21 being adjustable relative to the X' axis for the definition of the separation hues $T_0$. For an arbitrary color locus F' within the hue region 21, the rotated chrominance signal x' corresponds to the color saturation in a first approximation given a small angle $\beta$, and the quotient $y'/x' = \tan\beta$ corresponds to the deviation of the scanned color from the selected separation hue $T_0$, whereby the quotient increases with increasing deviation.

FIG. 2 also shows the complementary hues within a sector 22 which belongs to the defined separation hue, said sector 22 having arisen by mirroring the hue region 21 at the Y' axis of the X'Y' color coordinate system 20. The rotated chrominance signal x' is positive for the defined hues but is negative for the complementary hues. It frequently proves necessary in the production of color separations to combine fluctuations or progressions in the gray and to separate them as a uniform "gray". Such a region 23 for "gray" is indicated in FIG. 2 around the gray axis 24, whereby the boundary of the region 23 is defined by a boundary color saturation value $x'_g$.

Now referring again to FIG. 1, the rotated chrominance signal x' generated in the transformation stage 18 is supplied via a line 25 to a selection stage 26 in the form of a diode circuit that only transmits the positive values of the rotated chrominance signal x' as signal +x'. A signal thus always appears at the output of the selection stage only when the hues of the colors scanned from the color original 1 lie on the side of the defined hue region 21 with reference to the Y' axis of the rotated X'Y' color coordinate system 20 (FIG. 2). Thus, in this case, complementary hues are not provided, so that an exact separation of hues and complementary hues is advantageously achieved.

The rotated chrominance signal y' proceeds from the transformation stage 18 via a line 27 to an absolute value stage. The absolute value of the rotated chrominance signal y' is formed in the absolute value stage 28 as signal $|y'|$.

The critical angle $\beta_g$ for the desired hue region 21 (FIG. 2) is determined by setting the amplitude of the signal $|y'|$ by a potentiometer 29.

In the illustrated exemplary embodiment, the signals $+x'$ and $|y'|$ are supplied via lines 30 and 31 to a divider stage 32 in which the hue signal T' is acquired by quotient formation according to equation (5).

$$T' = \frac{|y'|}{+x'} = \tan\beta \quad (5)$$

The hue signal T' supplies information regarding the amount of deviation of the hues of the colors scanned on the color original 1 from the established separation hue $T_0$, whereby the hue signal T' is zero given hue coincidence ($\beta = 0$).

The divider stage 32 is followed by a subtractor stage 33 in which the hue signal T' supplied via the line 10 is limited to the hue region according to equation (6) and is transformed into the hue control signal T* on the line 13.

$$T^* = f_1(T')$$

$$T^* = H_0 - T' \quad (6)$$

Given hue coincidence ($\beta = 0$), the hue control signal T* is equal to the constant value $H_0$ which is preferably selected at $H_0 = \tan y_0/x_0$, decreases with increasing hue deviation, and reaches the value zero at the boundaries of the established hue region. Alternatively to setting the critical angle $\beta_g$ of the hue region with the assistance of the potentiometer 29, the critical angle can also be set by amplitude modification of the hue signal T' or of the value $H_0$.

Figure 3:
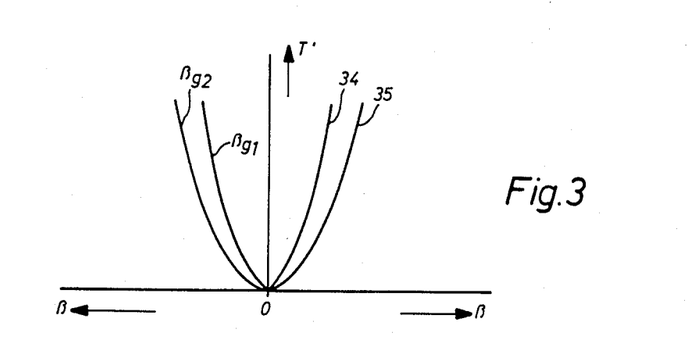
FIG. 3 is a signal curve of a hue signal.

FIG. 3 shows the hue signal T' with two curves 34 and 35 which result for two critical angles $\beta_g$ of the hue region differently set by the potentiometer 29.

Figure 4:
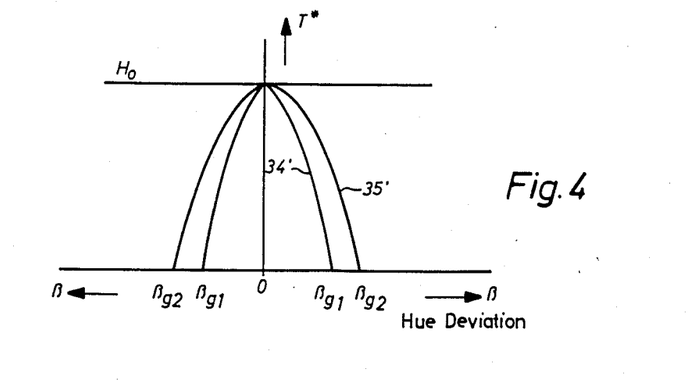
FIG. 4 is a signal curve of a hue control signal.

FIG. 4 shows the corresponding curves 34' and 35' of the hue control signal T* or of the single color separation signal A when color saturation and luminance are left out of consideration.

In an approximate solution, the hue signal is $T' \simeq |y'|$. In this case, the divider stage 32 is eliminated and the signal $|y'|$ on the line 31 is directly forwarded to the subtractor stage 33.

When a color separation is then to be produced for a selected separation color, the hue region must be additionally defined with respect to color saturation and luminance and the single color separation signal A must be limited such that it differs from zero only for a color region of the color space that corresponds to the separation color.

For this purpose, the luminance signal L' is acquired in a luminance signal generator 36 designed as an adder to which the measured color value, signals R, G, and B are supplied via lines 4, the luminance signal L' being acquired therein from at least one and preferably from all three of the measured color value signals R, G, and B according to the relationship $$L' = a_{31}R + a_{32}G + a_{33}B.$$

The luminance signal z formed in the transformer stage 17 can also be employed as the luminance signal L' in case all three measured color value signals R, G, and B participate in the formation of the luminance signal L'. In this case, the luminance signal generator 36 can be omitted.

The luminance signal L' on the line 11 is converted into the luminance control signal L* on the line 14 in a signal shaping stage 37 connected following the luminance signal generator 36, and are converted according to equation (7):

$$L^* = f_2(L')$$

$$L^* = f_{g1} k_1 (W - L') \quad (7)$$

The signal shaping stage 37 is composed of a subtraction stage 38 in which the differential signal from a voltage value W adjustable with the assistance of a potentiometer 39 and the luminance signal L' is formed, of a gradation stage 40 in which the differential signal is modified according to the gradation function $f_{g1}$, and of a potentiometer 41. Component $k_1$ of the differential signal which is to be employed as luminance control signal L* is determined with the potentiometer 41.

Figure 5:
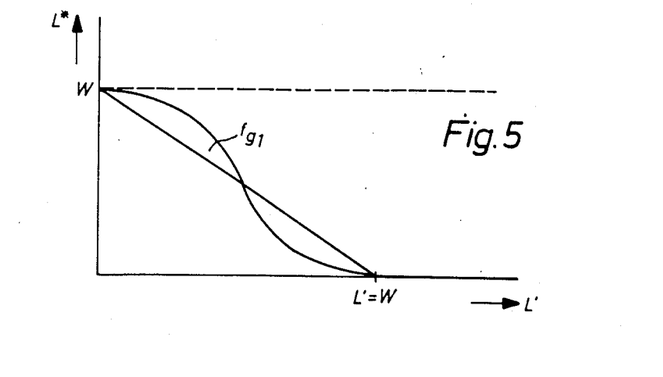
FIG. 5 is a signal curve of a luminance signal.

The voltage value W is the standardized white level to which all three measured color value signals R, G, and B were compensated when measuring the brightest, neutral picture location (white spot) on the color original 1 during the white level calibration of the color scanner. Given a luminance signal L' which is not present, the luminance control signal L* is therefore equal to the white level W, decreases with increasing luminance signal L', and reaches the value zero given a value of the luminance signal L' corresponding to the white level W. FIG. 5 shows a typical curve of the luminance control signal L*.

Figure 9:
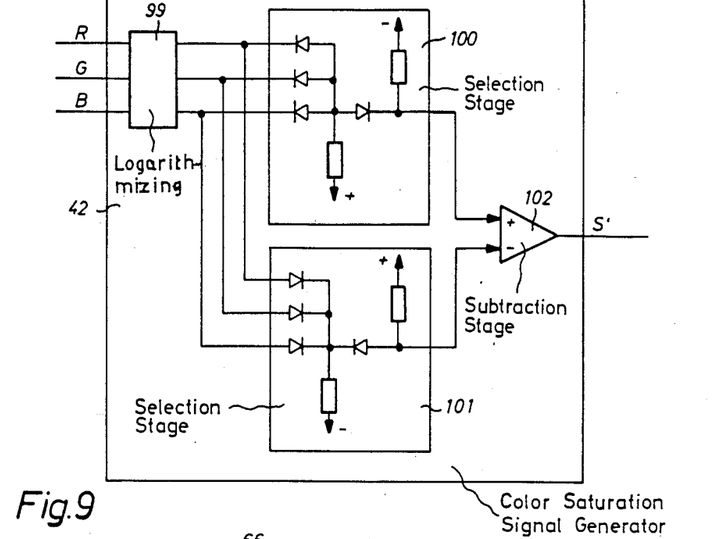
FIG. 9 is an illustrative embodiment of a color saturation signal generator.

The color saturation signal S' on the line 12 is generated in a color saturation signal generator 42. The color saturation signal S' can be acquired according to the equation $S' = \sqrt{x^2 + y^2}$ from the chrominance signals x and y formed in the transformer stage 17 which are supplied to the color saturation signal generator 42 via the lines 43 indicated with broken lines. In this case, the color saturation signal S' reproduces the exact color saturation values of the colors scanned on the color original 1. The color saturation signal generator 43 then contains arithmetic modules (squarers, adders, evolution units) which, however, do not permit a high working speed. In order to eliminate this difficulty, a color saturation signal S' approximated to the exact color saturation values is advantageously employed. In this case, the approximated color saturation signal S' is derived from the measured color value signals R, G, and B proceeding via lines 4 to the color saturation signal generator 43. They are derived since the maximum and the minimum measured color value signal is continuously identified and the differential signal of the extreme values is formed, this approximately corresponding to the color saturation signal S'. This is true, of course, since the maximum measured color value signal respectively represents the color saturation and the minimum measured color value signal represents the gray scale of a scanned color. Since the color saturation signal generator 42 now contains a maximum and a minimum selection stage as well as a differential stage (but none of the arithmetic modules cited above have these) the work speed can be increased in an advantageous fashion. FIG. 9 shows an illustrative embodiment of the color saturation signal generator 42.

The color saturation signal S' on the line 12 is transformed into the color saturation control signal S* on the line 15 according to equation (8) in a signal shaping stage 44 connected following the color saturation signal generator.

$$S^* = f_3 (S')$$

$$S^* = f_{g2} k_2 S' \qquad (8)$$

The signal shaping stage 44 contains a gradation stage 45 and a potentiometer 46. The color saturation signal S' is modified according to the gradation function $f_{g2}$ in the gradation stage 45 and that amplitude-wise component $k_2$ of the color saturation signal S' which is to be employed as a color saturation control signal S*, is determined with the assistance of the potentiometer 46.

Figure 6:
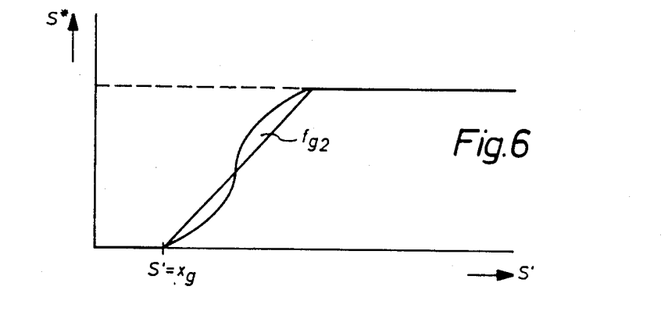
FIG. 6 is a signal curve of a color saturation signal.

The gradation function $f_{g2}$ is preferably selected such that the color saturation control signal S* is zero up to a boundary color saturation value $x_g$ already explained in FIG. 2, and then rises according to the gradation function $f_{g2}$ and reaches a constant value at a maximum color saturation value. FIG. 6 shows a typical curve of the color saturation control signal S*.

In case an even rougher approximation is allowed in the formation of the color saturation signal S', the signal +x' can also be employed, this being supplied to the signal shaping stage 44 instead of the color saturation signal S'. The color saturation signal generator 42 is omitted in this case.

In the described illustrative embodiment, the hue control signal T*, the color-saturation control signal S*, and the luminance control signal L* are combined in multiplicative fashion in the logic stage 16 according to equation (9) to form the single color separation signal A. Alternatively, the combination can also occur additively:

$$A = T^* \cdot S^* \cdot L^* \qquad (9)$$

The logic stage comprises, for example, two multiplication stages 48 and 49 and switches 50. A product signal M is first formed in the multiplication stage 48 from the color saturation control signal S* and/or the luminance control signal L*, whereby the participating signals are selectable by the switches 50. The single color separation signal A is acquired in the second multiplication stage 49 from the hue control signal T* and the product signal M. Instead of the multiplication stage 49, a switch controlled by the product signal M can also be employed for the hue control signal T*.

The respective dependency of the single color separation signal A on hue, color saturation, and luminance can be seen from the signal curves shown in FIGS. 4, 5, and 6. With respect to the hue, the single color separation signal A has a maximum value ($H_0$) given hue coincidence, decreases with increasing hue deviation from the separation hue ($T_0$), and reaches the value zero at the established boundaries of the hue region (21). With respect to color saturation, the single color separation signal A is equal to zero in a gray region up to the boundary color saturation value $x_g$ and then increases with increasing color saturation values in the scanned colors. With respect to the luminance values, the single color separation signal A decreases with increasing luminance values and reaches the value zero given a luminance value which corresponds to the white level.

A desaturation of hues and colors lying outside of the established region is advantageously achieved by the described way of forming the single color saturation signal A. At the same time, the color progression or the color transition in a color separation is improved such that the region boundaries are no longer recorded sharp, but in overlapping fashion. A zone of mixed printing arises during the later printing due to the overlap, the blended colors no longer being printed next to one another but on top of one another in said zone, a disturbance of color contours being thus avoided.

The dependency of the single color separation signal A on the hue, the color saturation, and the luminance can be individually adapted by the variable curves of the control signals T*, S*, L*, whereby the production of color separations for single color printing is significantly improved. For example, color separations for dark or light colors can be produced, whereby the light or dark colors are desaturated or corrected to white. On the other hand, color separations can be produced for colors having low or high color saturation, whereby the highly saturated or the unsaturated colors are corrected to white.

FIG. 7 shows an illustrative embodiment of the opto-electronic scanning element 3. The scan light 51 reflected or transmitted by the color original 1 proceeds through lenses 52 and 53 and through a diaphragm 54 into the scanning element 3, and is split there into three sub-beams 57, 58, and 59 by two dichroic color splitters 55 and 56. The sub-beams 57, 58, and 59 are incident through corrective color filters 60, 61, and 62 onto opto-electronic transducers 63, 64, and 65 which convert the received sub-light into the primary measured color value signals R, G, and B in accordance with the intensities of the primary color components at the scanned colors.

FIG. 8 shows an illustrative embodiment of the transformation stage 18.

In the transformation stage 18, the chrominance signals $x_0$ and $y_0$ of the selected separation hue $T_0$ are rotated during a balancing operation by monotonous variation of the angle $\alpha$ such that the rotated chrominance signals are $x'_0 > 0$ and $y' = 0$, whereby the angle $\alpha_0$ thus found is retained. This coordinate rotation is executed according to equation (3).

The continuously generated chrominance signals x and y are then rotated according to equation (4) during the point-by-point and line-by-line scanning of the color original 1.

The transformation stage 18 is composed of four multiplier stages 66, 67, 68, and 69, of an adder stage 70, of a subtractor stage 71, of a read-only memory 72, of an address counter 73, of a gate stage 74, of a clock generator 75, as well as of a monitoring stage 76.

The multiplier stages 66, 67, 68, and 69 are advantageously constructed of multiplying digital-to-analog converters, for example of integrated modules of the type AD 7542 of Analog Devices. A selectable factor can be input into such a multiplying digital-to-analog converter via a data input in the form of digital values which are storable in an internal register. An analog signal present at the input of the multiplying digital-toanalog converter is multiplied by the established factor, whereby the product is again available as an analog signal at the output of the multiplying digital-to-analog converter.

During the balancing operation, the chrominance signal $x_0$ coming from the transformer stage 17 indicated in broken lines is forwarded to the inputs 77 and 78 of the multiplier stages 66 and 67, whereas the chrominance signal $y_0$ proceeds to the inputs 79 and 80 of the multiplier stages 68 and 69. The corresponding sine and cosine values for angular values from 0° through 360° are stored in the read-only memory 72 as digital values $b = e = \cos \alpha$ and $c = d = \sin \alpha$ callable by the corresponding angular values $\alpha$ as addresses of the read-only memory 72. The data output 81 of the read-only memory 72 for the digital values $b = e = \cos \alpha$ is connected via a data bus 82 to the data inputs 83 and 84 of the multiplier stages 66 and 69 and the corresponding data output 85 for the digital values $c = d = \sin \alpha$ is connected via a data bus 86 to the data inputs 87 and 88 of the multiplier stages 67 and 68.

The switchable clock generator 75 is in communication with the clock input 89 of the address counter 73 via the gate stage 74. The output 90 of the address counter 73 is connected via an address bus 91 to the address input 92 of the read-only memory 72. The outputs 93 and 94 of the multiplier stages 66 and 68 communicate with the adder stage 70, and the outputs 95 and 96 of the multiplier stages 67 and 69 communicate with the subtractor stage 71. The output of the adder stage 70 and the output of the subtractor stage 71 are connected to the monitoring stage 76 for the conditions $x'_0 > 0$ and $y'_0 = 0$. The monitoring stage 76 communicates with a control input 97 of the gate stage 74.

The balancing operation is initiated by switching on the clock generator 75 with the assistance of a key 98. The counting clock of the clock generator 75 is counted into the previously reset address counter 73, whereby the incrementing counter reading corresponds to the momentarily rising angular values. The address counter 73 successively calls in the addresses of the read-only memory 72. The digital values $\cos \alpha$ and $\sin \alpha$ belonging to the angular values are transferred into the multiplier stages 66, 67, 68, and 69 and are multiplied therein by the corresponding chrominance signals $x_0$ and $y_0$. The individual products are added to or subtracted from one another, so that the rotated chrominance signal $x'_0$ appears at the output of the adder stage 70 and the rotated chrominance signal $y'_0$ appears at the output of the subtractor stage 71. The rotated chrominance signals $x'_0$ and $y'_0$ are thus continuously monitored by the monitoring stage 76.

The monitoring stage 76 outputs a control signal to the gate stage 74 when the conditions are met, the counting clock being thus interrupted. The counter reading thus reached and fixed in the address counter 73 corresponds to the desired angle $\alpha_0$.

FIG. 9 shows an illustrative embodiment of the color saturation signal generator 42 for generating the color saturation signal S' from the measured color value signals R, G, and B.

The measured color value signals R, G, and B supplied from the opto-electronic scanning element 3 (not shown) are logarithmized or partially logarithmized in a logarithmizing stage 99 and are simultaneously supplied to a maximum selection stage 100 and a minimum selection stage 101 which identify the maximum and minimum measured color values from the measured color value signals R, G, and B. The color saturation signal S' is formed in a differential stage 102 connected following the maximum selection stage 100 and the minimum selection stage 101, being formed therein as the differential signal from the identified maximum and minimum measured color values.

Although various minor changes and modifications might be proposed by those skilled in the art, it will be understood that I wish to include within the claims of the patent warranted hereon all such changes and modifications as reasonably come-within my contribution to the art.

I claim as my invention:

1. A method for production of color separations of a color original for single color printing, comprising the steps of:
   (a) scanning the color original trichromatically point-by-point and line-by-line with an opto-electronic scanning element for generating measured color values R, G, B representing colors of the original;
   (b) determining a color locus $F_0$ of a separation hue $T_0$ of a selected separation color of the original represented by color values $R_0$, $G_0$, $B_0$;
   (c) transforming the color locus $F_0$ of the separation hue $T_0$ into a color locus $F'_0$ in a chrominance plane of a chrominance/luminance color space by a first transformation of the color values $R_0$, $G_0$, $B_0$ into chrominance values $x'_0$, $y'_0$ such that the transformed color locus $F'_0$ lies on one of the axes of an X'Y' color coordinate system in the chrominance plane, and retaining transformation coefficients required therefor;
   (d) defining a hue recognition region around the separation hue $T_0$ and generating a separation signal A when a hue of a color represented by the measured color values R, G, B falls into the defined region;
   (e) recording a color separation point-by-point and line-by-line with a recording element controlled by the separation signal A; and
   (f) during the recording of the color separation
      (i) continuously transforming color loci F of hues of colors of the scanned original into color loci F' in the chrominance plane by a second transformation of the measured color values R, G, B into chrominance values x', y' with the previously retained transformation coefficients;
      (ii) selecting those chrominance value x', y' whose corresponding transformed color loci F' lie in the same half of the X'Y' color coordinate system as the transformed color locus $F'_0$ of the separation hue $T_0$;
      (iii) deriving a hue signal T' from at least the chrominance values y', the chrominance values y' corresponding to value distances of the transformed color loci F' from one of the axes of the X'Y' color coordinate system, said hue signal T' being an approximate measure of an absolute amount of deviation of the hues of the colors of the scanned original from the separation hue $T_0$;
      (iv) deriving a hue control signal T* from a substantially constant auxiliary control signal $H_0$ and the hue signal T', said hue control signal T* having its highest value when the separation hue $T_0$ is scanned and having a value of zero when a hue having a prescribed maximum deviation from the separation hue $T_0$ is scanned, whereby a sector-shaped hue recognition region is defined around the separation hue $T_0$; and (v) employing the hue control signal $T^*$ to generate the separation signal A for recording the color separation as a color separation of the separation hue $T_0$.

2. A method according to claim 1 including the step of deriving the hue signal $T'$ by obtaining the quotients of the selected chrominance values $x'$, $y'$, the quotients corresponding to the tangents of angles ($\beta$) which are described by one of the axes of the $X'Y'$ color coordinate system and lines connecting the origin of the $X'Y'$ color coordinate system and trasnformed color loci $F'$ of the hues of the colors of the scanned original.

3. A method according to claim 1 including the step of deriving the hue control signal $T^*$ by forming the difference between the auxiliary control signal $H_0$ and the hue signal $T'$.

4. A method according to claim 1 further including for definition of said selected separation color, the steps of:
(a) generating a color saturation signal $S'$ from the measured color values R, G, B and generating a luminance signal $L'$ from at least one of the measured color values R, G, B;
(b) deriving a color saturation control signal $S^*$ by at least one of amplitude modification and non-linear modification of the color saturation signal $S'$;
(c) deriving a luminance control signal $L^*$ by forming a difference signal corresponding to the difference between a voltage value W and the luminance signal $L'$ and by at least one of amplitude modification and non-linear modification of the difference signal; and
(d) generating the separation signal A for recording the color separation as a color separation of the separation color, by combining the hue control signal $T^*$ with selected at least one of the color saturation control signal $S^*$ and the luminance control signal $L^*$, whereby the color saturation control signal $S^*$ and the luminance control signal $L^*$ are combined with the hue control signal $T^*$ such that the color separation of the selected separation color is recorded wih decreasing density values given decreasing color saturation values and increasing luminance values of the selected separation color of the original.

5. A method according to claim 4 wherein the voltage value W corresponds to a white level to which measured color values R, G, B corresponding to the lightest neutral portion of the color original are adjusted.

6. A method according to claim 4 wherein the color saturation signal $S'$ is derived by performing the steps of
(a) selecting the maximum and minimum measured color values of the measured color values R, G, B; and
(b) deriving the color saturation signal $S'$ by forming the difference of the maximum and minimum measured color values.

7. A method according to claim 4 including the step of combining in multiplicative fashion the hue control signal $T^*$, the color saturation control signal $S^*$, and the luminance control signal $L^*$ to generate the separation signal A.

8. A method according to claim 4 including the step of combining in multiplicative fashion the color saturation control signal $S^*$ and the luminance control signal $L^*$ into a product signal, and generating the separation signal A by switching the hue control signal $T^*$ on and off in accordance with said product signal.

9. A method according to claim 4 wherein the color saturation control signal $S^*$ is zero from a color saturation value of zero up to a boundary color saturation value $x_g$ which defines an expanse of a gray region around a luminance axis Z of the chrominance/luminance color space and increases in value from the boundary color saturation value $x_g$ up to a maximum color saturation value where it becomes constant.

10. a method according to claim 1 including the step of determining the color values $R_0$, $G_0$, $B_0$ of the separation hue $T_0$ by opto-electronically measuring the hue of the selected separation color of the original.

11. A method according to claim 1 including the step of setting the prescribed maximum deviation from the separation hue $T_0$ by amplitude modification of the chrominance value $y'$.

12. A method according to claim 1 wherein the first transformation of the color values $R_0$, $G_0$, $B_0$ of the separtion hue $T_0$ into the chrominance values $X'_0$, $y'_0$ is performed by the steps of:
(a) matrixing the measured color values $R_0$, $G_0$, $B_0$ into chrominance values $x_0$, $y_0$ of an XY color coordinate system in the chrominance plane corresponding to a transformation of the RGB color space into the chrominance/luminance color space according to the equations $x_0 = a_{11}R_0 + a_{12}G_0 + a_{13}B_0$ $y_0 = a_{21}R_0 + a_{22}G_0 + a_{23}B_0$; and (b) performing a coordinate rotation of the chrominance values $x_0$, $y_0$ of the XY color coordinate system into the chrominance values $x'_0$, $y'_0$ of the $X'Y'$ color coordinate system which is rotated by an angle ($\alpha$) relative to the XY color coordinate system, said coordinate rotation being dependent on a position of the color locus $F_0$ of the separation hue $T_0$ within the chrominance plane and corresponding to a rotation of the chrominance/luminance color space around a luminance axis Z thereof according to the equations $x'_0 = x_0 \cos \alpha + y_0 \sin \alpha$ $y'_0 = -x_0 \sin \alpha + y_0 \cos \alpha$ whereby the angle ($\alpha$) which causes the transformed color locus $F'_0$ of the separation hue $T_0$ to lie on one of the axes of the $X'Y'$ color coordinate system is retained as a transformation coefficient ($\alpha_0$).

13. A method according to claim 12 wherein the second transformation of the measured color values R, G, B into the chrominance values $x'$, $y'$ is performed by the steps of:
(a) matrixing the measured color values R, G, B into chrominance values x, y of the XY color coordinate system in the chrominance plane corresponding to a transformation of the RGB color space into the chrominance/luminance color space according to the equations $x = a_{11}R + a_{12}G + a_{13}B$ $y = a_{21}R + a_{22}G + a_{22}B$; and (b) peforming a coordinate rotation of the chrominance values x, y of the XY color coordinate system into the chrominance value x', y' of the X'Y' color coordinate system by the angle ($\alpha_0$) according to the equations $$x' = x \cos \alpha_0 + y \sin \alpha_0$$

$$y' = -x \sin \alpha_0 + y \cos \alpha_0.$$

14. A method according to claim 12 including the step of varying the angle ($\alpha$) by an automatic balancing operation until one of the chrominance values $x'_0$ and $y'_0$ of the X'Y' color coordinate system becomes zero and the other chrominance value $y'_0$ or $x'_0$ becomes greater than zero, whereby the angle ($\alpha$) thus found is retained as the transformation coefficient ($\alpha_0$).

15. An apparatus for production of color separations for a color original for single color printing, comprising:

(a) opto-electronic scanning means for scanning the color original for obtaining measured color values R, G, B;
   (b) separation signal circuit means for generating a separation signal A;
   (c) recording means connected to the separating signal circuit means for point-by-point and line-by-line recording of a color separation;
   (d) said separation signal circuit means comprising
       (i) transformation circuit means connected to the opto-electronic scanning means for transforming the measured color values R, G, B into chrominance values x', y' of an X'Y' color coordinate system in a chrominance plane of a chrominance/luminance color space;
       (ii) selection and absolute value circuit means connected to the transformation circuit means for selection of certain of said chrominance values x', y' and formation of absolute values of certain of said chrominance values x', y';
       (iii) setting means for defining a hue recognition region connected to the selection and absolute value circuit means;
       (iv) divider means connected to the setting means to generate a hue signal T' from said selected chrominance values and said abosolute values; and
       (v) differential means connected to the divider means and the recording means to derive a hue control signal T* from said hue signal T' for use in generating said separation signal A.

16. An apparatus according to claim 15 wherein the separation signal circuit means further comprises for definition of a separation color:

(a) color saturation signal generator means and luminance signal generator means connected to the opto-electronic scanning means to generate a color saturation signal S' and a luminance signal L' from the measured color values R, G, B;
   (b) adjustable signal shaping means connected to the color saturation and luminance signal generator means for generating a color saturation control signal S* and a luminance control signal L*; and
   (c) logic means connected to the differnetial means, the adjustable signal shaping means, and the recording means for selective combination of the hue control signal T* with at least one of the color saturation control signal S* and the luminance control signal L* for generating the separation signal A.

17. An apparatus according to claim 16 wherein the logic means comprises multiplier means.

18. An apparatus for production of color separations of a color original for single color printing, comprising:

(a) means for scanning the color original trichromatically point by-point and line-by-line with an opto-electronic scanning element for generating measured color values R, G, B representing colors of the original;
   (b) means for determining a color locus $F_0$ of a separation hue $T_0$ of a selected separation color of the original represented by color values $R_0$, $G_0$, $B_0$;
   (c) means for transforming the color locus $F_0$ of the separation hue $T_0$ into a color locus $F'_0$ in a chorminance plane of a chrominance/luminance color space by a first transformation of the color values $R_0$, $G_0$, $B_0$ into chrominance values $x'_0$, $y'_0$ such that the transformed color locus $F'_0$ lies on one of the axes of the X'Y' color coordinate system in the chrominance plane, and retaining the transformation coefficients required therefor;
   (d) means for defining a hue recognition region around the separation hue $T_0$ and generating a separation signal A when a hue of a color represented by the measured color values R, G, B falls into the defined region;
   (e) means for recording a color separation point-by-point and line-by-line with a recording element controlled by the separation signal A;
   (f) means for continuously transforming color loci F of hues of colors of the scanned original into color loci F' in the chrominance plane by a second transformation of the measured color values R, G, B into chrominance values x', y' with the previously retained transformation coefficients;
   (g) means for selecting those chrominance values x', y' whose corresponding transformed color loci F' lie in the same half of the X'Y' color coordinate system as the transformed color locus $F'_0$ of the separation hue $T_0$;
   (h) means for deriving a hue signal T' from at least the chrominance values y', the chrominance values y' corresponding to value distances of the transformed color loci F' from one of the axes of the X'Y' color coordinate system, said hue signal T' being an approximate measure of an absolute amount of deviation of the hues of the colors of the scanned original from the separation hue $T_0$;
   (i) means for deriving a hue control signal T* from a substantially constant auxiliary control signal $H_0$ and the hue signal T', said hue control signal T* having its highest value when the separation hue $T_0$ is scanned and having a value zero when a hue having a prescribed maximum deviation from the separation hue $T_0$ is scanned, whereby a sector-shaped hue recognition region is defined around the separation hue $T_0$; and
   (j) means for employing the hue control signal T* to generate the separation signal A for recording the color separation as a color separation of the separation hue $T_0$.

19. A method for production of color separations from a color original for single color printing, comprising the steps of:

(a) acquiring measured color values R, G, B by scanning the color original;

(b) transforming the measured color values R, G, B into chrominance value x', y' of an X'Y' color coordinate system in a chrominance plane of a chrominance/luminance color space;

(c) selecting certain of said chrominance value x', y' and forming absolute values of certain of said chrominance values x', y';

(d) generating a hue signal T' from said selected chrominance values and said absolute values;

(e) deriving a hue control signal T* from said hue signal T' for use in generating a separation signal A; and (f) recording a color separation point-by-point and line-by-line with the separation signal A.

* * * * *